United States Patent [19]

Herbst

[11] Patent Number: 5,413,320

[45] Date of Patent: May 9, 1995

[54] FLUID MOUNT FOR DEVICES SUCH AS ENGINES

[75] Inventor: Paul T. Herbst, Erie, Pa.

[73] Assignee: Lord Corporation, Erie, Pa.

[21] Appl. No.: 79,294

[22] Filed: Jun. 17, 1993

[51] Int. Cl.[6] .............................................. F16F 9/10
[52] U.S. Cl. ........................... 267/140.13; 267/141.7; 248/562; 248/636
[58] Field of Search .......... 267/64.15, 140.11–140.13, 267/140.2, 140.4, 140.5, 141.1, 141.2, 141.7, 219; 248/562, 609, 631, 636; 105/198.3

[56] References Cited

U.S. PATENT DOCUMENTS

| 2,705,118 | 3/1955 | Beck | 248/10 |
|---|---|---|---|
| 3,915,421 | 10/1975 | Le Forestier | 248/631 |
| 4,361,296 | 11/1982 | Hall et al. | 244/54 |
| 4,460,168 | 7/1984 | Obadal | 267/140.1 |
| 4,583,503 | 4/1986 | Kumagai et al. | 123/192 R |
| 4,606,427 | 8/1986 | Beer | 180/300 |
| 4,634,081 | 1/1987 | Chee | 244/54 |
| 4,784,378 | 11/1988 | Ford | 267/219 |
| 4,790,521 | 12/1988 | Ide et al. | 267/219 |
| 4,811,919 | 3/1989 | Jones | 244/54 |
| 4,842,258 | 6/1989 | Misaka et al. | 267/140.1 |
| 4,869,476 | 9/1989 | Shtarkman | 267/140.1 |
| 4,881,712 | 11/1989 | Lun | 248/562 |
| 4,962,915 | 10/1990 | Thorn | 267/140.1 |
| 4,974,819 | 12/1990 | Reichard et al. | 267/140.1 |
| 5,150,657 | 9/1992 | Bourgeot | 267/140.4 X |
| 5,174,552 | 12/1992 | Hodgson et al. | 248/636 X |
| 5,312,093 | 5/1994 | Smith et al. | 267/140.11 |

FOREIGN PATENT DOCUMENTS

| 1163502 | 9/1958 | France | 267/141.1 |
|---|---|---|---|
| 9222636 | 12/1984 | Japan | 267/140.13 |
| 175835 | 9/1985 | Japan | 267/141.1 |

Primary Examiner—Robert J. Oberleitner
Assistant Examiner—Alfred Muratori
Attorney, Agent, or Firm—Randall S. Wayland; Richard K. Thomson; James W. Wright

[57] ABSTRACT

A fluid mount (20) provides a flexible connection and fluid effects such as damping and/or fluid inertia for a supported member (22) attached to a supporting member (24) in a singular and unitary package. The fluid mount (20) includes a beam (34) and a laminated elastomer and shim construction bonded thereto, defining variable volume fluid chambers (44, 46, 48, 50) and interconnecting fluid passageways (52, 54). Fluid effects are provided in both a radial translational mode (loading at R) and a rotational mode (loading at T) to suppress vibrations of the supported member (22).

20 Claims, 8 Drawing Sheets

FLUID MOUNT FOR DEVICES SUCH AS ENGINES

FIELD OF THE INVENTION

This invention relates to the area of mounts for attaching a supported member to a supporting member. Specifically, the invention relates to the area of fluid and elastomer mounts for providing vibration attenuation of the vibration emanating from a supported member.

BACKGROUND OF THE INVENTION

Fluid mounts for attachment between a supporting member and a supported member are taught in U.S. Pat. No. 4,811,919 to Jones, the disclosure of which is hereby incorporated by reference. In Jones '919, the fluid inertia within the mount can be tuned to provide amplified counter inertial forces that coincide with an operating frequency of a vibrating aircraft engine. However, in order to produce these fluid forces the beam 11 of mount must be loaded in a particular direction such that fluid is transferred from chamber 40 to chamber 41 through tube 45. This can only be accomplished by translation of stub shaft 10 toward frame 20 in a vertical direction thus urging fluid to flow through tube 45. Torsional or cocking rotation of the Jones '919 mount will not set the fluid in motion through tube 45 and hence, no damping or inertial effects will be obtained.

U.S. Pat. No. 2,705,118 to Beck, the disclosure of which is also hereby incorporated by reference, discloses a mounting arrangement that incorporates fluid damping in either a torsional mode or a vertical mode, depending on the orientation of the mounts, but not in both orientations at once. Beck '118 describes a fluid torque restraint in FIG. 4, wherein mounts are located on opposite sides of the torque axis of gear box 17. When torque is applied, fluid 6 in chambers 5 and conduits 9 are placed in compression. This provides a high degree of torque restraint, i.e., a high torsional stiffness. However, when the gear box 17 is subjected to vertical translational loads, fluid is free to flow through conduit 9 and valve 10, thus providing damping and a soft translational stiffness. In the FIG. 3 embodiment, contrarily, the mount arrangement imparts a high vertical stiffness yet provides a low rotational or torsional stiffness. When the engine 11 is subjected to rotational or torsional loading, fluid is free to flow through conduit 9 and valves 10, thus providing fluid damping and a low torsional stiffness. However, the Beck '118 device cannot provide damping in both the vertical and rotational modes simultaneously. Further, the mounts in Beck must be spaced on opposite sides of the torque axis of the supported body.

U.S. Pat. No. 4,881,712 to Lun discloses an engine mount assembly 16 which displaces fluid from engine mounts 20 to 22 through track 23 to provide damping when subjected to torsional loading. However, mount 16 cannot provide damping when the loading is vertical on both mounts 20 and 22 because no fluid will flow through track 23.

U.S. Pat. No. 4,784,378 to Ford discloses a mounting assembly for supporting an engine 10 including mounts 20 and 30 interconnected by conduits 41 and 42 and vacuum accumulator 70. Although Ford can provide some vertical-mode, as well as torsional-mode, damping, the mounts must be spaced on opposite sides of a torque axis. Further the exposed conduits are subject to failure due to corrosion and strikes. Furthermore, several mounts are required to provide torsional support.

SUMMARY OF THE INVENTION

In light of the advantages and shortcomings of the related art, it is therefore a primary object of the present invention to provide a novel fluid-and-elastomer mount which provides fluid effects when loaded both with a torsional motion input and a vertical motion input within a unitary package.

Another objective is to provide a fluid-and-elastomer mount which provides fluid effects consisting of at least one of fluid inertia and damping when subject to loading which imparts torsional motions and/or translational motions to the fluid mount.

In summary, it is a feature of the instant invention to satisfy the abovementioned objects by providing a unitary fluid-and-elastomer mount for attaching a supported member to a supporting member, comprising a beam having a length, width, and thickness, a first end, a second end spaced apart from said first end along said length, and means for attaching to said supported member, said first end is on a first side of said means for attaching and said second end is an opposite side of said means for attaching, a first elastomer and second elastomer both attached to said length of said beam on said first end, said first elastomer member at least partially defining a first variable-volume chamber, said second elastomer member at least partially defining a second variable-volume chamber; a third elastomer and fourth elastomer attached to said length of said beam on said second end, said third elastomer at least partially defining a third variable-volume chamber, said fourth elastomer at least partially defining a fourth variable-volume chamber; a first fluid passageway fiuidically interconnecting said first variable-volume chamber and second variable-volume chamber; a second fluid passageway fiuidically interconnecting said third variable-volume chamber and said fourth variable-volume chamber; a fluid contained within, and substantially filling, said first, second, third, and fourth variable-volume chambers and said first and second fluid passageways, whereby torsional loading causes rotation of said beam about an axis (A) extending across said width of said beam and translational loading of said beam causes translational movement, and each type of loading causes said fluid to flow through said first and said second fluid passageways creating at least one selected from the group of fluid effects consisting of fluid damping and fluid inertia.

It is another feature of the instant invention to satisfy the abovementioned objects by providing a unitary fluid-and-elastomer mount, comprising a beam having a length, width, thickness, a first end, a second end spaced apart from said first end, and means for attaching to one of a supported member and a supporting member, a first fluid assembly for providing a fluid effect attached to said first end of said beam including means for attaching to the other of said supporting member and supported member, a second fluid assembly for providing a fluid effect attached to said second end of said beam including means for attaching to the other of said supporting member and supported member, and each of said fluid assemblies including multiple variable-volume chambers, whereby rotational and translational loading of said beam causes a fluid effect.

It is an advantage of the present invention that damping can be provided in both the vertical and rotational modes in a singular-unitary package.

It is an advantage of the present invention that fluid can be lost out of one of the fluid assemblies and fluid damping or inertia effects can still be retained in the other fluid assembly.

It is an advantage of the present invention that damping can be provided in both the vertical and rotational modes in a singular-unitary package for interconnecting an engine to a frame or a body to a frame.

The abovementioned and further objects, novel features, and advantages of the present invention will become apparent from the accompanying descriptions of the preferred embodiments and attached drawings.

BRIEF DESCRIPTION OF THE DRAWINGS

The accompanying drawings, which form a part of the specification, illustrate several embodiments of the present invention. The drawings and description together serve to fully explain the invention. In the drawings.

DETAILED DESCRIPTION OF THE INVENTION

Figure 1:
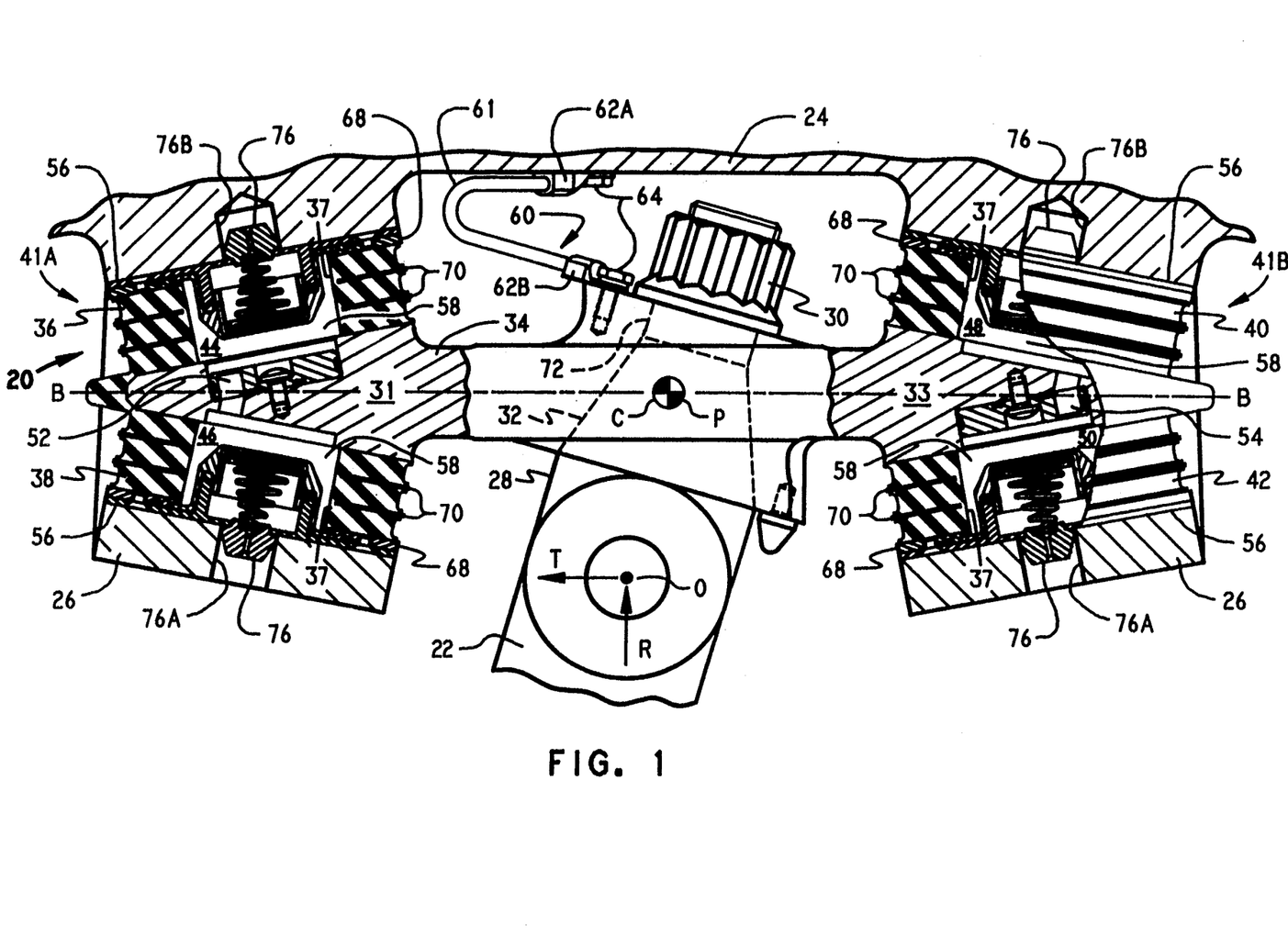
FIG. 1 is a partially sectioned side view of the mounting as seen along line 1—1 in FIG. 2 illustrating an embodiment of fluid mount shown installed between a supported member and a supporting member.

Referring now to the drawings, an embodiment of the fluid mount is shown in FIG. 1, generally at 20. The fluid mount 20 flexibly attaches, and interconnects, a supported member 22 such as an engine or transmission to a supporting member 24 such as a structure, frame, or yoke. The fluid mount 20 is attached to supported member 22 by way of conebolt 28 or other means for interconnecting or attaching. The conebolt 28 includes a taper 32 which is urged into contact with like taper on beam 34 by torqueing nut 30. The conebolt 28 connects to beam 34 at attachment point P which is substantially centralized on beam 34. The conebolt 28 attaches to supported member 22 at point O which is offset from the elastic center C of the fluid mount 20. The attachment point P and elastic center C of mount 20 coincide in this embodiment, but need not. The connection at point O can be a solid or rigid connection, a pin joint, or a universal or ball joint, or other means for connecting to the supported member 22, depending on the loading and number of fluid mounts 20 required. Alternatively, beam 34 could also be directly attached to supported member 22. Likewise, the fluid mount 20 could be turned around and the beam 34 could attach to supporting member 24.

Beam 34 has a length L and width W and includes a first end 31 and a second end 33 spaced apart along the length L. Beam 34 is preferably manufactured from forged stainless steel. Attached and bonded to first end 31 of beam 34, is first elastomer 36. First elastomer 36 is integrally bonded not only to beam 34, but also to both flat sides of shims 70, and the underside of inner member 68. Shims 70 and outer member 68 are also manufactured from stainless steel. Each layer of first elastomer 36 is rectangular in shape and approximately constant thickness and includes a pocket 37. All the elastomer sections are preferably manufactured from natural rubber, high temperature natural rubber, silicone elastomer, or a like flexible material having a static secant shear modulus of preferably about 67 pounds per square inch (psi) or a range of modulus of between about 50–250 pounds per square inch (psi) and an approximate loss factor or tan delta (tan del) of approximately 0.1. This alternating shim and elastomer construction is known as laminated elastomer and shim construction. End member 56 seals pocket 117 in elastomer 36 to at least partially define and form first variable-volume chamber 44 having a substantial volume stiffness of greater than 100 pounds per square inch per cubic inch (psi/in$^3$).

Likewise, a second elastomer 38 at least partially defining second variable-volume chamber 46 is attached to beam 34 on the underside thereof and is identical in construction to first elastomer 36. Likewise, end member 56 closes pocket 37 in second elastomer 38 to form second variable-volume chamber 46 also having a substantial volume stiffness of greater than 100 pounds per square inch per cubic inch (psi/in$^3$). At least one of end members 56 contacts cap 26 which in turn connects to supporting member 24, thus, causing an interconnection. A first fluid passageway 52 fluidically interconnects first chamber 44 and second chamber 46 which are of substantially equal volume stiffness. A fluid (not shown) such as glycol, silicone, or perfluorinated polyether is contained within and substantially fills the first and second variable-volume chambers 44, 46 and acts as the working fluid. Alternatively, air could provide the working fluid with proper sizing of passageway 52. The length l, diameter d, and shape of entrance and exits to passageway 52, fluid density $\rho$, and fluid kinematic viscosity $\mu$ can be tuned to provide appropriate fluid effects such as tuned and amplified counter-inertial forces and/or fluid damping. First and second elastomers 36 and 38, first and second chambers 44 and 46, and first passageway 52 make up first fluid assembly 41A. Multiple fluid passageways and decoupler mechanisms can also be added as is known to those skilled in the art to provide the desired fluid effects.

On an opposite side of attachment point P is third elastomer 40 which is attached to beam 34 at second end 33 and bonded to beam 34, shims 70 and outer member 68. The third elastomer 40 is identical to first and second elastomer 36 and 38. The third elastomer 40 at least partially defines a third variable-volume chamber 48. Likewise end member 56 covers pocket 37 to form third variable-volume chamber 48 of substantially equal volume stiffness as chambers 44 and 46 and a volume stiffness value of greater than 100 pounds per square inch per cubic inch (psi/in$^3$).

On the underside of end 33 is fourth elastomer 42 which is bonded to beam 34, shims 70, and outer member 68. The fourth elastomer 42 is identical to first, second, and third elastomers 36, 38, and 40. The fourth elastomer 42 at least partially defines a fourth variable-volume chamber 50. Likewise end member 56 closes pocket 37 to form fourth variable volume chamber 50 of substantially equal volume stiffness as chambers 44, 46, and 48 and having a volume stiffness of greater than 100 pounds per square inch per cubic inch (psi/in$^3$). A second fluid passageway 54 fluidically interconnects chambers 48 and 50. Further, a fluid is contained within and substantially fills fluid chambers 48, 50 and second passageway 54 and acts as the working fluid. Third and fourth elastomers 40 and 42, third and fourth chambers 48 and 50, and second passageway 54 make up second fluid assembly 41B.

Ground strap 60 electrically grounds supported member 22 to supporting member 24. Ground strap 60 includes strap ends 62A and 62B and strap 61 all made of an electrically conductive material. Strap ends 62A and 62B are attached to supporting member 24 and beam 34 by bolts 64.

Caps 26, which are U-shaped, compress elastomers 36, 38, 40, and 42 by way of bolts (not shown) which connect to supporting member 24 to provide precompression to elastomers 36, 38, 40, and 42. Caps 26 are adjacent elastomers 36, 38, 40, and 42 and act as the means for connecting to the supporting member 24. Precompression ensures loads applied in the translational or radial (as viewed from the engine 22) direction cause translational motion (along arrow R) and do not unload elastomers 38 and 42. Likewise, loading in a direction opposed to arrow R will tend to unload elastomers 36 and 40 which will be countered by the precompressive force. Loads along arrow T in the tangential direction will impart a rotation to beam 34 as a result of the moment arm extending between elastic center C and point O and tend to unload elastomers 38 and 40. Applying a load (both radial or tangential) at a point spaced from the elastic center C will impart a moment to beam 34 and result in rotation of beam 34 about an axis A (FIG. 2) which passes through C and extends across the width of beam 34. Likewise, when a load is applied in a direction opposed to arrow T, elastomers 36 and 42 will tend to unload. Precompression prevents elastomers 36, 38, 40, and 42 from unloading under rotational or radial loading.

Both radial loading (along arrow R) and tangential loading (along arrow T) will cause fluid to flow through passageways 52 and 54 in the present invention and create a fluid effect such as fluid inertia and fluid damping. For radial loading along arrow R, the passageway length l, diameter d, fluid density $\rho$ and viscosity $\mu$, volume stiffness Kv, radial spring rate Kr, piston area Ap, and elastomeric damping tan del can be tuned to provide a fluid effect such as an amplified counter inertial force to substantially coincide with an operating frequencies of interest. In the present invention, by way of example and not by limitation, the length l=1.5 inches (in.), the diameter d=0.320 inches (in.), the density $\rho=0.064$ pounds per cubic inch (lb./in.$^3$), the viscosity $\mu=2$ centistokes (Cs), the volume stiffness of each chamber Kv=1120 pounds per square inch per cubic inch (psi/in.$^3$), the dynamic radial stiffness of the mount Kr=140,000 pounds per inch (lb./in.), the piston area Ap=7.00 square inches (in$^2$), and tan del=0.1 are chosen to provide a fluid notch or lowest dynamic stiffness (force divided by input deflection transfer function) in the range of between 65-80 Hz. This will provide improved performance in a band width of approximately 40-90 Hz. When operating within this range, lowered transmitted forces will occur.

Once these fluid parameters are tuned, the same inertia effects will result from torsional loading in the present invention. Loading of conebolt 28 at point O along arrow T will cause rotation of beam 34 and a resultant flow of fluid through passageways 52 and 54, thus, creating counter inertial forces in rotational or torsional mode. The passageways 52, 54, elastomers 36, 38, 40, and 42, and fluid and elastomer parameters, d, l, $\rho$, $\mu$, Kv, Kr, tan del, and Ap can be chosen to provide an alternate fluid effect, such as damping, under radial loading and torsional loading, as well. For a further explanation of fluid amounts, reference is made to an article entitled "Understanding Hydraulic Mounts For Improved Vehicle Noise, Vibration, and Ride Qualities" by Wallace Flower, SAE Technical Paper Series No. 850975, May 1985, the disclosure of which is hereby incorporated by reference herein.

The present invention fluid mount 20 provides damping and/or fluid inertia effects singly or in combination in both a rotational mode and in a translational mode and within a unitary, singular, and integrated package. The mount 20 is sold and installs as a unit. The mount also includes within it multiple variable-volume chambers and are interconnected in a double pureper arrangement. In a double pumper arrangement, the fluid in each chamber 44, 46, 48, and 50 is positively acted upon (pushed) by the piston to move the fluid through passageways 52 and 54 in either direction as a function of load direction. Whereas, in a single pumper, the piston acts positively only on one chamber for flow in one direction and negatively acts (pulls) on the fluid in the same fluid chamber for return flow. Because of this, a single pureper configuration is less effective, as the fluid will cavilate more easily when acted upon negatively (pulled). The present invention has the further advantage that fluid can be lost out of one of the fluid assemblies 41A or 41B and damping can still be provided by the remaining one of fluid assemblies 41B or 41A.

Figure 2:
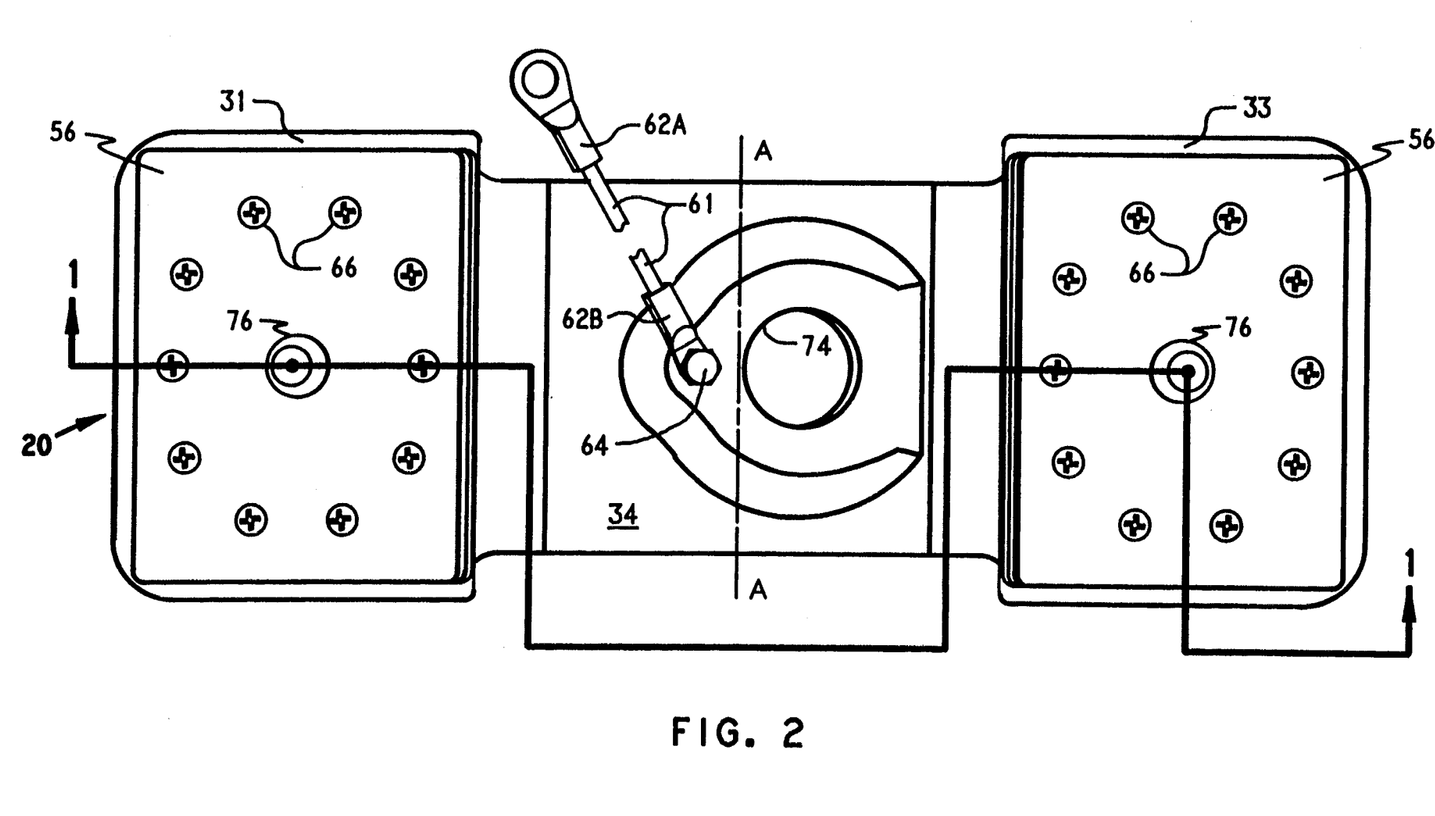
FIG. 2 is a top view of the fluid mount.

FIG. 2 illustrates a top view of the present invention fluid mount 20. The supported member 22, supporting member 24, conebolt 28, and nut 30 are omitted, for clarity. Shown in a more detailed fashion are the end members 56 including screws 66 arranged in a circular pattern adjacent ends 31 and 33 of beam 34 for securing end members 56 to outer members 68 (FIG. 1). Also shown are pilots 76 which are received within pilot holes 76A (FIG. 1) and pilot bores 76B (FIG. 1). Pilots 76 locate end members 56 and restrain any sheafing motion of end members 56 (FIG. 1) relative to caps 26 or supported member 24. Note, that the rotational motion or mode of beam 34 is about axis A. Also note, that threaded section 72 (FIG. 1) of conebolt 28 is received in bore 74 formed in beam 34.

Figure 3:
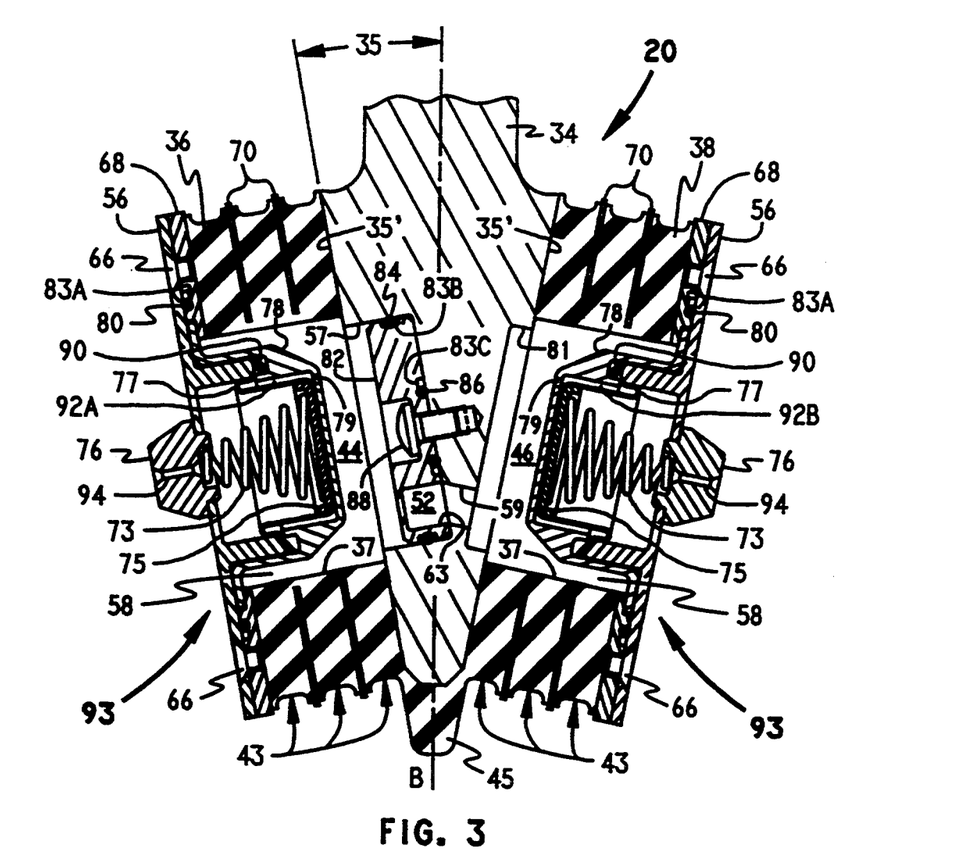
FIG. 3 is an enlarged sectional view of an end of the mount showing the fluid mount components.

FIG. 3 illustrates an enlarged and sectioned end view of the fluid mount 20 wherein the details are Fully illustrated. Beam 34 includes angled taper 35 of approximately 11 degrees from center which translates to approximately a 22 degree included angle. This taper 35 provides a surface for bonding elastomers 36, 38, 40, and 42 to and increases the tangential spring rate of the mount by supplying a compression component. The tangential static secant spring rate (along axis B) of the present invention is approximately 7000 pounds per inch (lb./in.) whereas, the fore and aft static secant stiffness (along axis A) is approximately 3,500 pounds per inch (lb./in.)

The beam 34 includes bore 57 with a flat bottom formed therein for receiving insert 82. Insert 82 is oval shaped, is manufactured from stainless steel and has second and third grooves 83B and 83C for accepting second and third seals 84 and 86. Torqueing fastener 88 causes seal 86 to compress, where seal 84 is compressed due to interference fit with bore 57. These seals 84 and 86 ensure fluid flow through passageways 52 and 54 and not around edges of insert 82. Further, insert 82 cooperates with flat bottom on bore 57 to form a portion of fluid passageway 52. Insert 82 includes a tool cut portion 63 following an oval or semi-circular path forming a partial or semi-circular portion of passageway 52. The remainder of passageway 52 is made from hole 59 extending through beam 34. The depth, width and length of semi-circular tool cut portion 63 of passageway 52 can be varied to affect the fluid damping and inertia effects as is known to those skilled in the art. This insert 82 can easily be changed out for quick changes in fluid characteristics without having to rebond mount 20.

Elastomers 36 and 38 are bonded to a side of outer member 68, both sides of shims 70 and tapered surface 35' of beam 34. Outer member 68, and both flat surfaces of shims 70, are in substantially parallel relation with its respective surface 35' of beam 34. Bumper 45 is formed of elastomer and is used as a snubber or stop for preventing beam 34 from contacting any portion of a pocket formed in yoke 24 which receives the mount 20 under translational loading (along axis B). The pocket 37 formed in elastomers 36 and 38 is preferably circular in shape, but could be of any shape practicable. Further, contours 43 are added to the outside periphery of elastomers 36 and 38 to increase fatigue life of fluid mount 20. Outer member 68 includes a first groove 83A for receiving first seal 80.

Securing end member 56 to outer member 68 by screws 66 compresses first seal 80, thus, preventing escape of the fluid. Further, cup 78 of compensator assembly 93 is positioned by outer member 68 engaging and compressing seal 90 formed on diaphragm 77 preventing escape of fluid contained within first and second variable volume chambers 44 and 46 when screws 66 are tightened. Pilot 76 presses into end member 56 with an interference fit. Recess 81 provides clearance such that cup 78 does not contact beam 34 under heavy compression loading of elastomer 38. Further, a like clearance is present on the opposite side between cup 78 and beam 34 to prevent contact when elastomer 36 is subjected to heavy compression loading.

Spring 73 is retained within the underside of pilot 76 and also in a pocket formed in retainer 75. The spring 73 is preferably of conical-coil-spring type and manufactured from steel with a spring rate of approximately 20 pounds per inch (lb./in.). Diaphragm 77 is of a fabric-reinforced variety of elastomer and fabric construction. Cups 78 of volume compensator assemblies 93 act as separators between chamber 44 and compensation chamber 92A and between and chamber 46 and compensation chamber 92B. Compensator assemblies 93 are preferably of the mechanical type. Commonly assigned application Ser. No. 07/873,309 entitled "High-Temperature Fluid Mounting" describes fully a similar volume compensator 93 of the mechanical-type spring loaded like the one used in the present invention and how the compensator functions to pressurize the mount and compensate for changes in fluid volume due to temperature, the disclosure of which is hereby incorporated by reference herein. Port 79 allows limited fluid flow between first compensator chamber 92A and first variable volume chamber 44 and between second compensator chamber 92B and second variable volume chamber 46, albeit not across the rolling diaphragm. Relief hole 94 in pilot 76 allows compression of spring 75 without a buildup of air pressure in chambers 92A and 92B, although, if desired, the features of a gas spring could be incorporated into the volume compensator 93 by the omission or proper sizing of this relief hole 94.

Figure 3A:
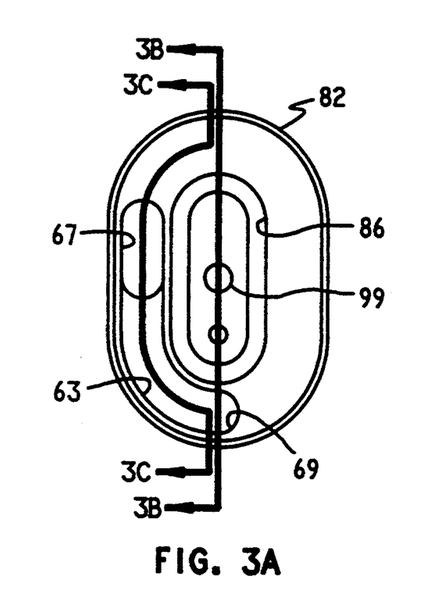
FIG. 3A is a frontal view of the insert assembly including a fluid passageway.
Figure 3B:
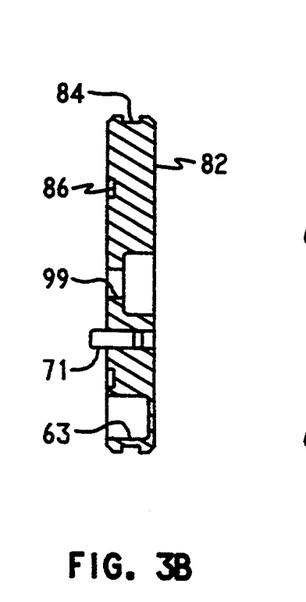
FIG. 3B is a sectioned side view of the insert as seen along line 3B—3B in FIG. 3A.
Figure 3C:
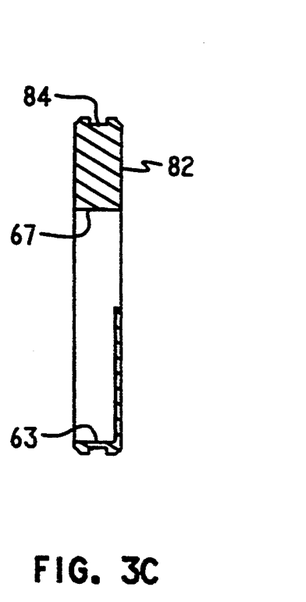
FIG. 3C is another sectioned side view of the insert as seen along line 3C—3C in FIG. 3A.

FIGS. 3A, 3B, and 3C illustrate the insert 82 in full detail. Insert 82 includes an oval body of stainless steel including tool cut portion 63 and grooves 84 and 86. Hole 99 is formed for receiving fastener 88 (FIG. 3). Pin 71 press fits into insert 82 and performs a locator function such that insert 82 can only be inserted one way in oblong bore 57 (FIG. 3). Exit 69 from insert 82 matches with hole 59 in beam 34 (FIG. 3). Entrance 67 is oval and elongated to reduce fluid losses. The insert 82 is easily removable to retune the mounts 20 (FIG. 1) characteristics by simply removing fasteners 66 and 88.

Figure 4A:
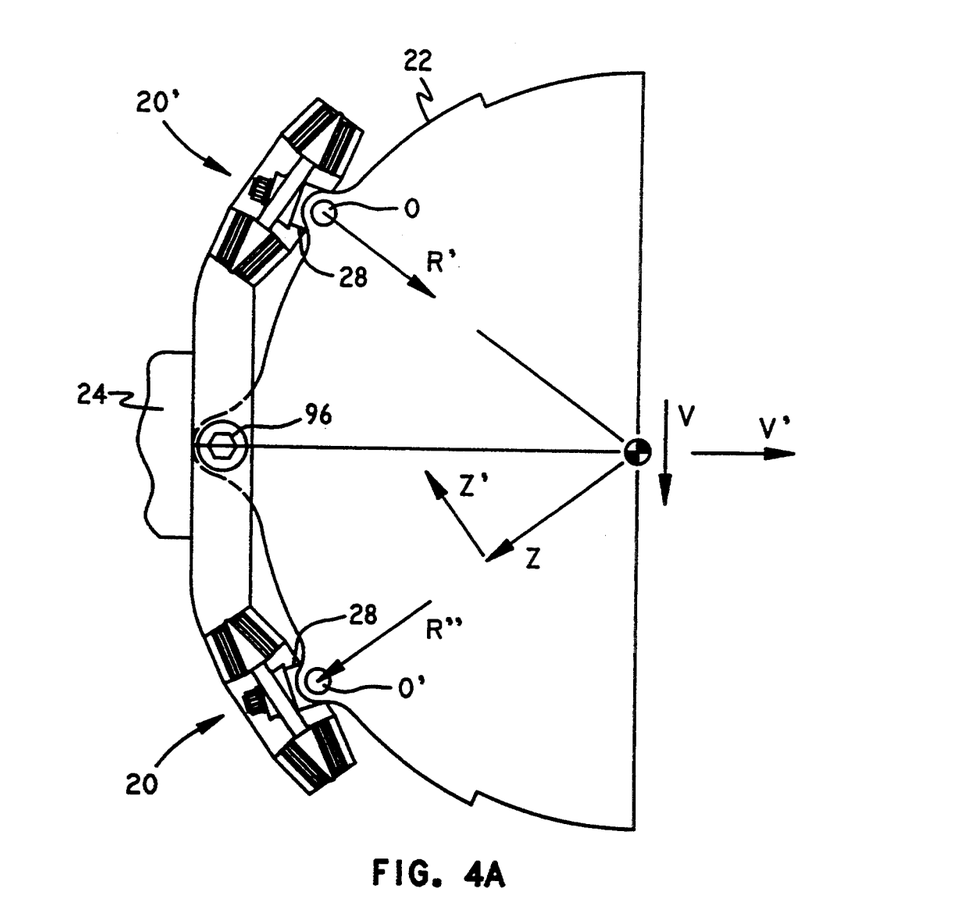
FIG. 4A is a schematic front view of the fluid mount shown installed on a jet engine.

FIG. 4A schematically illustrates one installation for the fluid mounts 20 and 20' looking down the center of a jet engine. In this installation, the supported member 22 is a jet engine which is flexibly attached to supporting member 24 such as a yoke, hangar, pylon, fuselage, or frame. The mounts 20 and 20' are spaced about the periphery of the front portion of the engine. Further mounts 20 and 20' are retained in pockets formed in supporting member 24. This arrangement would be practical for both fuselage mounted engines where vertical downward direction is indicated by arrow V and under wing mounted engines where the vertical downward direction is indicated by arrow V'. Conebolts 28 provide a ball joint connection at points O and O'. Free floating safety pin 96 provides a fail-safe feature or snubbing should one or both fluid mounts 20 and 20' be lost.

In both orientations depicted in FIG. 4A, at least one other mounting would be required for support of the aft portion of the engine. Damping of the low frequency, high amplitude engine motions occurring during runway or takeoff conditions is accomplished by throttling fluid through passageways 52, 54 (FIG. 1). On a fuselage mounted engine, vertical engine loading along V causes radial or translational loading of mounts 20 and 20' as shown by arrows R' and R" because mounts 20 and 20' are focalized. On an underwing mounted engine, vertical downward loading would be shown correctly by arrow R', but the direction of R" would be reversed. However, in both cases, dynamic loading due to a rotating unbalance vector causes radial or translational dynamic loading of fluid mount 20 and 20'. For example, dynamic radial or translational loading of lower mount 20 occurs when the unbalance vector is directed radially outward along Z from the engine CG. The same dynamic rotating unbalance vector gives rise to a tangential component of loading on lower mount 20 when directed tangentially along Z' which causes dynamic loading of the lower mount 20 in the torsional mode.

Figure 4B:
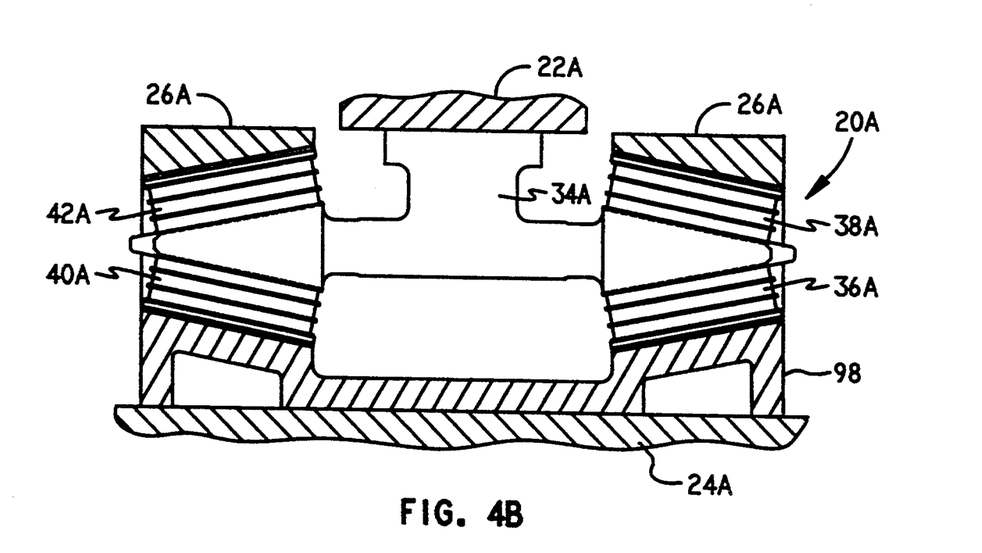
FIG. 4B is a cross-sectional side view of the fluid mount shown installed between a truck cab and a vehicle frame.

FIG. 4B illustrates another installation for the fluid mount 20A. In this installation, the supported member 22A could be a vehicle cab or body which is flexibly attached to supporting member 24A such as a vehicle frame. Only one mount 20A may be needed to support the aft portion of the vehicle cab and two tubeform type mountings would be utilized for the forward hinge of the vehicle cab. This arrangement will supply damping in the vertical direction due to jarring inputs, such as road inputs due to pot holes etc., as well as in the torsional direction due to body roll during cornering and maneuvers. Mounting 20A differs from mounting 20 in that beam 34A solidly and rigidly connects to supported member 22A. However, a latch and release mechanism could be used as well. Similarly, caps 26A precompress elastomers 36A, 38A, 40A, and 42A by way of torqueing bolts (not shown) which are secured to bracket 98. Bracket 98 in turn is attached to supporting member 24A.

Figure 5:
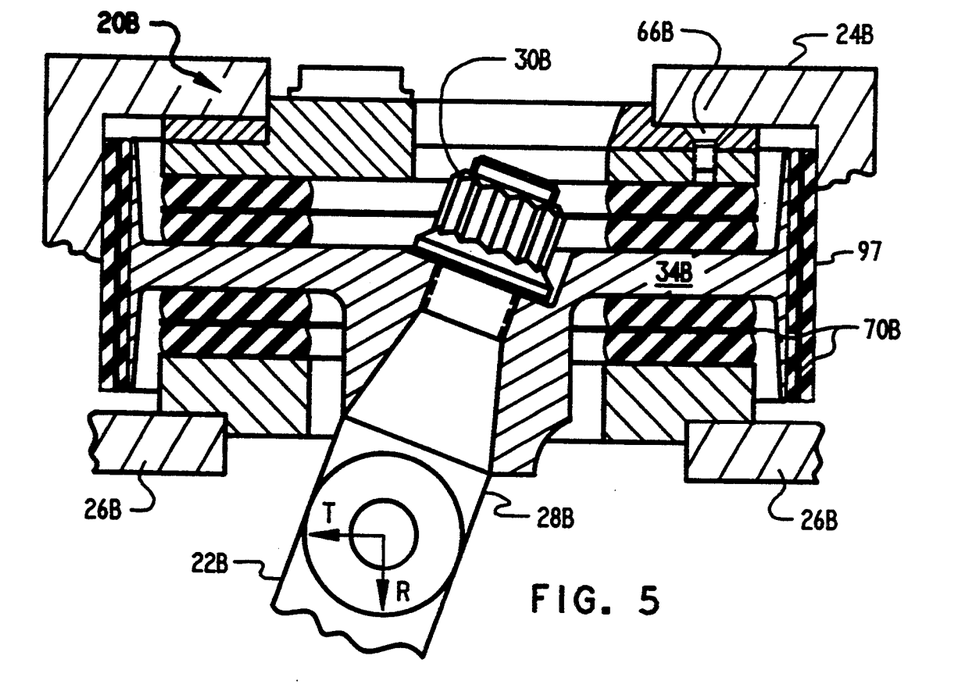
FIG. 5 is a cross-sectional side view of an alternate embodiment of the fluid mount as seen along line 5—5 in FIG. 7.
Figure 6:
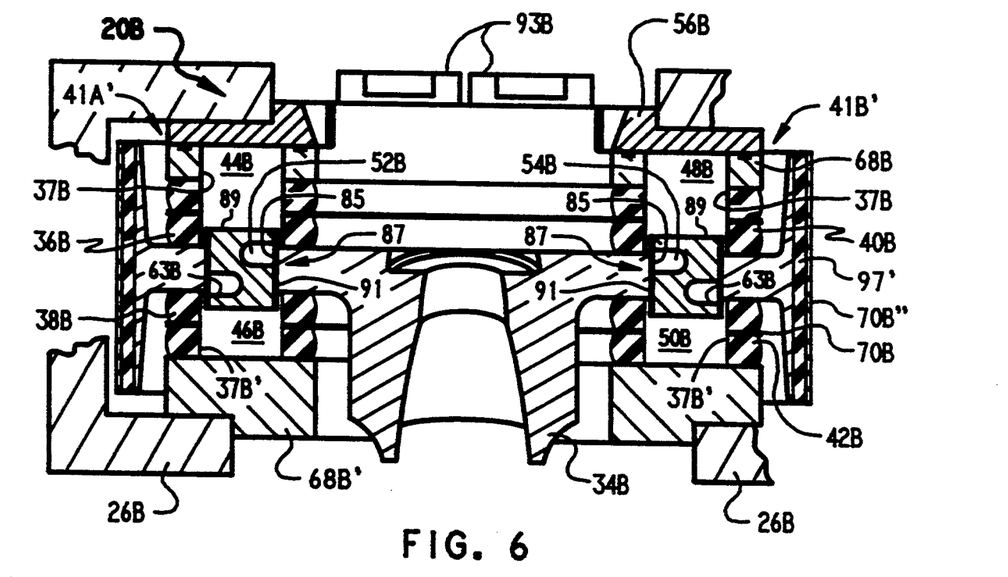
FIG. 6 is another cross-sectional side view of the alternate embodiment of the fluid mount as seen along line 6—6 in FIG. 7.

FIG. 5 and 6, illustrate another embodiment of the fluid mount 20B. In this embodiment like elements are denoted by like numerals. Mount 20B attaches between supported member 22B such as an engine, motor, or transmission and supporting member 24B such as a frame, hangar, yoke, or pylon in a similar manner to the FIG. 1 embodiment. Further, Beam 34B is attached to supported member 22B by conebolt 28B. However, this embodiment includes tangential elastomers 97 and 97' which are partial tubeform sections of laminated elastomer and shim construction and includes shim 70B'. Also, the elastomer forming first, second, third, and fourth elastomers 36B, 38B, 40B, and 42B are part of rings of elastomer of circular shape. First elastomer 36B and third elastomer 40B are connected and so are second elastomer 38B and fourth elastomer 42B, as they are part of the same ring of elastomer. Chambers 44B, 46B, 48B, and 50B are formed by pockets 37B and 37B' when closed and sealed by end member 56B and outer member 68B'. No end member is required for chambers 46B and 50B because these chambers 46B and 50B are formed during bonding by having the mold inserts pass through holes 85. Hole 85 is provided for press fitting and receiving passageway assembly 87 therein.

Passageway assembly 87 includes plug 89 with tool cut portion 63B and sleeve 91. Plug 89 is a cylindrical solid with a spiral tool cut portion 63B formed therein. Sleeve 91 slides over the periphery of plug 89 with an interference fit to form the passageway assembly 87 which, in turn, is inserted in hole 85 in beam 34B. Mechanical-type compensator assemblies 93B are used to accommodate the fluid expansion and provide pressurization to the mount 20. Similar to the FIG. 1 embodiment, fluid assemblies 41A' and 41B' are formed on opposed ends of beam 34B. Loading of mount 20B in the direction indicated by arrow T causes a rotational motion similar to the FIG. 1 embodiment. However, loading along R of the second embodiment of FIG. 5 and 6 will impart a rotation as well as a translational mode.

Figure 7:
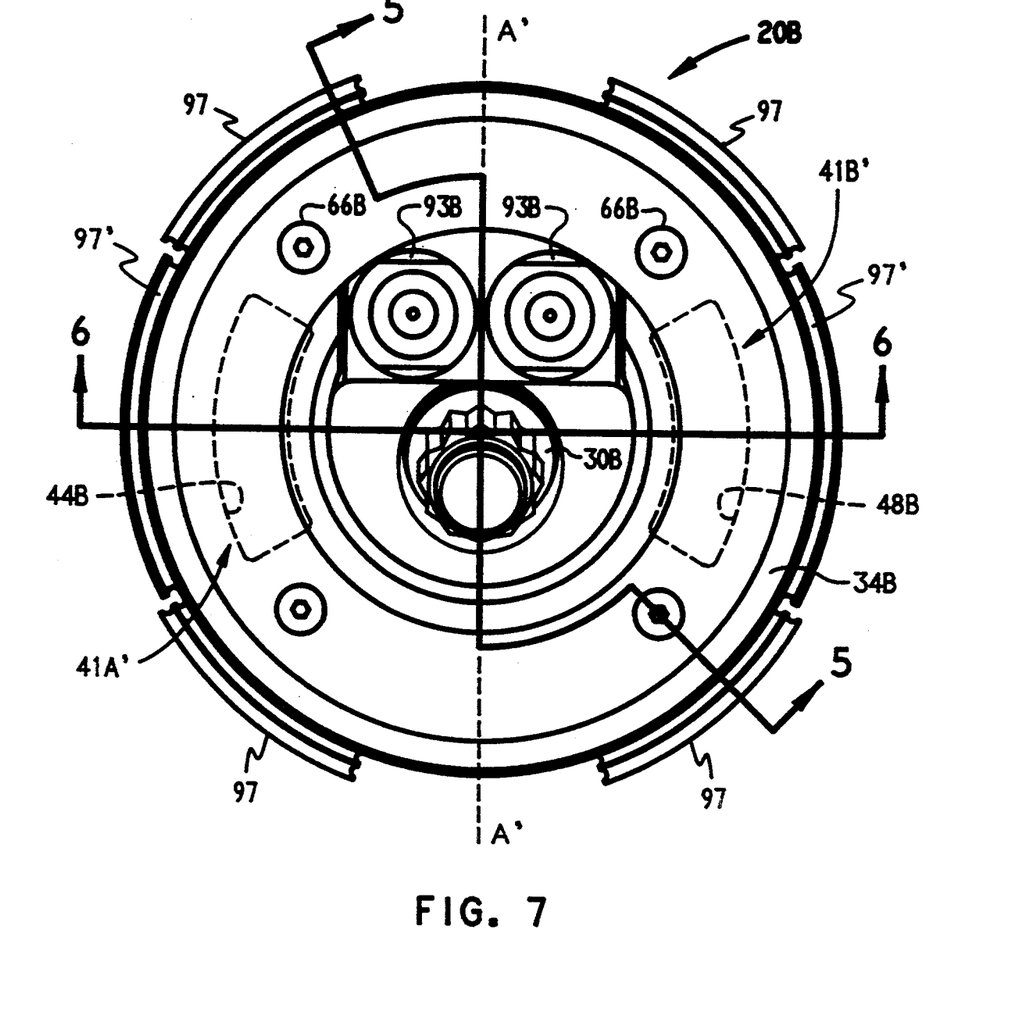
FIG. 7 is a top view of the alternate embodiment of the fluid mount.

FIG. 7 illustrates a top view of an embodiment of the fluid mount 20B. Illustrated are the location of pairs of arc-shaped first and second variable volume chambers 44B, 46B and third and fourth chambers 48B, 50B and circular shaped beam 34B. Four screws 66B secure end member 56B to outer member 68B (FIG. 6). In this embodiment, there are only two compensator assemblies 93B for the mount, i.e., one for each fluid assembly 41A' and 41B'.

Figure 8:
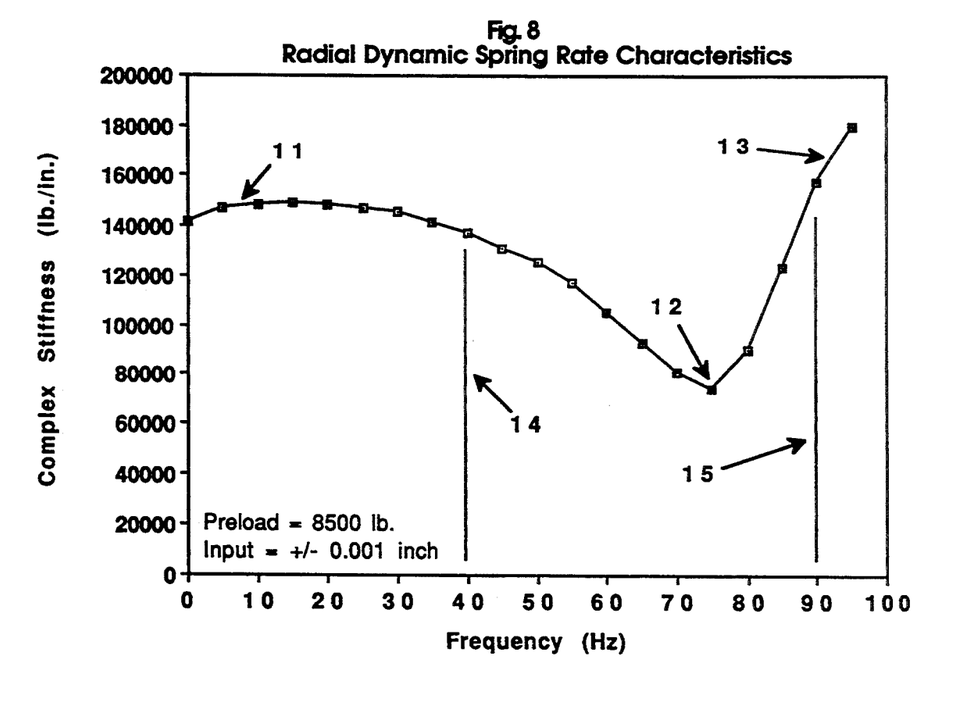
FIG. 8 is a performance curve of an embodiment of the fluid mount in the radial direction.

FIG. 8 illustrates a performance curve of an embodiment of the fluid mount 20. The radial dynamic spring rate or transfer function is plotted showing the low frequency dynamic complex stiffness approximately at 11 and the notch frequency at 12. Radial or translational loading is illustrated by loading the mount 20 (FIG. 4A) along arrows labeled R' and R''. This radial loading does not impart any substantial rotation to the beam 34 (FIG. 1). The dynamic loading causes a fluid resonance which creates the amplified counter-inertial forces which reduce the transfer function at the notch 12. As the phasing of the fluid motion relative to the input changes, the dynamic characteristics tend to stiffen at 13. A typical operating range would be tuned to provide some reduction in transmitted load between frequencies 14 and 15.

Figure 9:
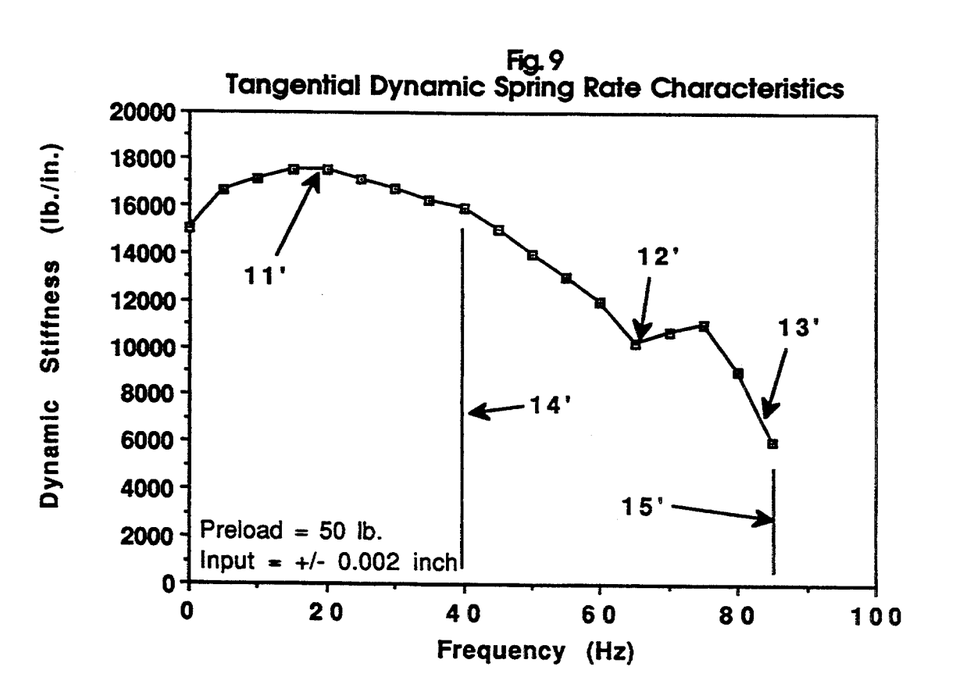
FIG. 9 is a performance curve of an embodiment of the fluid mount in the tangential direction.

FIG. 9 illustrates a performance curve of the same embodiment of the fluid mount 20 in the tangential direction. The tangential dynamic spring rate characteristics are plotted showing the low frequency dynamic complex stiffness at 11' and the notch at 12'. Normally, the dynamic characteristics of a fluid mount 20 will tend to stiffen for frequencies above the notch frequency 12'. However, a mass effect due to the cantilever loading the conebolt 28 (FIG. 1) actually reduces the dynamic spring rate further in this case at 13'. Loading in the tangential direction is due to torsional dynamic inputs of engine 22 (FIG. 4A) and rotational components of radial loading. Dynamically, this loading causes dynamic rotation of mount 20 forcing fluid to flow and creating a fluid effect. Specifically, a fluid inertial resonance occurs which creates a notch 12'. This amplified counter-inertial force tends to reduce the tangential force transmitted to the frame 24 (FIG. 4) within a range between 14' and 15'.

While several embodiments of the present invention have been described in detail, various modifications, alterations and changes may be made without departing from the spirit and scope of the present invention as defined in the appended claims.

What is claimed is:

1. A unitary fluid and elastomer mount for attaching a supported member to a supporting member, comprising:
   (a) a beam having a length, width, and thickness, a first end, a second end spaced apart from said first end along said length, and means for attaching to said supported member on said beam, said first end is on a first side of said means for attaching and said second end is on an opposite side of said means for attaching;
   (b) a first elastomer and a second elastomer both attached to said length of said beam on said first end, said first elastomer member at least partially defining a first variable-volume chamber, said second elastomer member at least partially defining a second variable-volume chamber;
   (c) a third elastomer and a fourth elastomer both attached to said length of said beam on said second end, said third elastomer at least partially defining a third variable-volume chamber, said fourth elastomer at least partially defining a fourth variable-volume chamber;
   (d) a first unobstructed fluid passageway fluidically interconnecting said first variable-volume chamber and said second variable-volume chamber;

(e) a second unobstructed fluid passageway fluidically interconnecting said third variable-volume chamber and said fourth variable-volume chamber;

(f) a hydraulic fluid contained within, and substantially filling, said first, second, third, and fourth variable-volume chambers and said first and second fluid passageways;

whereby torsional rotation of said beam about an axis (A) extending across said width of said beam and translational loading of said beam both cause said fluid to flow through said first and said second fluid passageways creating at least one from the group of fluid effects consisting of fluid damping and fluid inertia, said flow of fluid in a first direction through said first and second fluid passageways creating a fluid effect of a magnitude equal to that of an equivalent amount of fluid flowing in a second opposite direction.

2. A fluid and elastomer mounting according to claim 1 wherein said beam has tapered surfaces on said first end and on said second end and said first, second, third, and fourth elastomers are bonded to said tapered surfaces.

3. A fluid and elastomer mounting according to claim 2 wherein said tapered surfaces on said first end and said second end of said beam are positioned at an included angle of approximately 22 degrees.

4. A fluid and elastomer mounting according to claim 1 wherein said first, second, third, and fourth elastomers are manufactured from one of natural rubber, high temperature natural rubber, or silicone elastomer having a static secant shear modulus in the range of 50–250 psi.

5. A fluid and elastomer mounting according to claim 1 wherein said first, second, third, and fourth elastomers are manufactured from laminated shim and elastomer construction.

6. A fluid and elastomer mounting according to claim 1 further including a mechanical volume compensator for compensating for fluid expansion within said mounting.

7. A unitary fluid and elastomer mount, comprising:
(a) a beam having a length, width, and thickness, a first end having upper and lower surfaces, a second end spaced apart along said length of said beam and having upper and lower surfaces, said beam including means for attaching to a supported member, wherein said upper and said lower surfaces of at least one of said ends are non-parallel forming a tapered end portion;
(b) elastomer means partially forming a first variable-volume chamber and a second variable-volume chamber adjacent said first end of said beam and at least partially defining a third variable-volume chamber and a fourth variable-volume chamber adjacent said second end of said beam, said elastomer means adjacent to means for attaching to a supporting member;
(c) at least one fluid passageway, fluidically interconnecting at least two selected from the group of said first variable-volume chamber, said second variable-volume chamber, said third variable-volume chamber, and fourth variable-volume chamber;

whereby both radial and torsional loading each causes fluid to flow through said at least one fluid passageway, creating a fluid effect.

8. The unitary fluid and elastomer mount of claim 7 wherein said upper and lower surfaces of each end of said beam are non-parallel forming two tapered ends.

9. The unitary fluid and elastomer mount of claim 7 wherein said means for attaching to said supported member is a conebolt.

10. The unitary fluid and elastomer mount of claim 7 wherein said fluid effect is selected from a group including a tuned fluid inertia effect and a tuned fluid damping effect.

11. The unitary fluid and elastomer mount of claim 10 wherein said fluid inertia is tuned to provide a fluid notch that substantially coincides with a predominant operating frequency.

12. The unitary fluid and elastomer mount of claim 11 wherein said fluid inertia tuned to provide a notch at between about 40 and 90 Hz.

13. The unitary fluid and elastomer mount of claim 7 further including a fluid which has a density of 0.064 lb./in.$^3$ and a kinematic viscosity of about 2 Cs.

14. The unitary fluid and elastomer mount of claim 7 wherein said elastomer means are precompressed to prevent unloading.

15. The unitary fluid and elastomer mount of claim 7 wherein said first and said second variable-volume chambers are interconnected by a first passageway forming a first fluid assembly and said third and said fourth variable-volume chambers are interconnected by a second passageway forming a second fluid assembly.

16. The unitary fluid and elastomer mount of claim 15 wherein said beam of said first and second fluid assemblies positively acts on each of said multiple variable-volume chambers.

17. The unitary fluid and elastomer mount of claim 15 wherein one of said beam and said first and said second fluid assemblies interconnects to an engine and the other of said beam and said first and said second fluid assemblies interconnects to a frame.

18. The unitary fluid and elastomer mount of claim 15 wherein one of said beam and said first and said second fluid assemblies interconnects to a vehicle frame and another of said beam said first and said second fluid assemblies interconnects to a vehicle body.

19. The unitary fluid and elastomer mount of claim 7 wherein said beam is circular in shape.

20. A unitary fluid and elastomer mount, comprising:
(a) a beam having a length, width, and thickness, a first end, a second end spaced apart along said length of said beam, said beam including means for attaching to a supported member;
(b) elastomer means partially forming an independent first variable-volume chamber and an independent second variable-volume chamber adjacent said first end of said beam and at least partially defining an independent third variable-volume chamber and an independent fourth variable-volume chamber adjacent said second end of said beam, said elastomer means being adjacent to means for attaching to a supporting member;
(c) at least two fluid passageways, fluidically interconnecting at least two pairs selected from the group of said first variable-volume chamber, said second variable-volume chamber, said third variable-volume chamber, and said fourth variable-volume chamber so that both radial and torsional loading each causes fluid to flow through said at least two fluid passageways, creating a fluid effect selected from the group including a fluid inertia effect and a fluid damping effect.

* * * * *

UNITED STATES PATENT OFFICE
CERTIFICATE OF CORRECTION

PATENT NO. : 5,413,320
DATED : May 9, 1995
INVENTOR(S) : Paul T. Herbst

It is certified that error appears in the above–identified patent and that said Letters Patent is hereby corrected as shown below:

Col. 2, line 36, replace "fiuidically" with --fluidically--; line 39, replace "fiuidically" with --fluidically--.

Col. 4, line 32, replace "117" with --37--; line 47, replace "fiuidically" with --fluidically--.
Col. 5, line 18, replace "fiuidically" with --fluidically--.
Col. 6, line 24, replace "amounts" with --mounts--; line 36, replace "pureper" with --pumper--; line 45, replace "pureper" with --pumper--; line 46, replace "cavilate" with --cavitate--; line 60, replace "sheafing" with --shearing--.

Signed and Sealed this

Fourth Day of July, 1995

Attest:

BRUCE LEHMAN

*Attesting Officer*          *Commissioner of Patents and Trademarks*